United States Patent
Liu et al.

(10) Patent No.: US 10,654,004 B2
(45) Date of Patent: May 19, 2020

(54) HIGH FLUX REVERSE OSMOSIS MEMBRANE COMPRISING POLYETHERSULFONE/POLYETHYLENE OXIDE-POLYSILSESQUIOXANE BLEND MEMBRANE FOR WATER PURIFICATION

(71) Applicant: UOP LLC, Des Plaines, IL (US)

(72) Inventors: Chunqing Liu, Arlington Heights, IL (US); Nicole K. Karns, Des Plaines, IL (US); Howie Q. Tran, Skokie, IL (US); Dung Le, Mount Prospect, IL (US)

(*) Notice: Subject to any disclaimer, the term of this patent is extended or adjusted under 35 U.S.C. 154(b) by 144 days.

(21) Appl. No.: 16/041,609

(22) Filed: Jul. 20, 2018

(65) Prior Publication Data

US 2019/0060844 A1 Feb. 28, 2019

Related U.S. Application Data

(60) Provisional application No. 62/552,000, filed on Aug. 30, 2017.

(51) Int. Cl.

| | |
|---|---|
| B01D 71/68 | (2006.01) |
| B01D 71/08 | (2006.01) |
| B01D 71/28 | (2006.01) |
| C02F 1/44 | (2006.01) |
| B01D 69/10 | (2006.01) |
| B01D 71/76 | (2006.01) |
| B01D 69/02 | (2006.01) |
| B01D 71/70 | (2006.01) |
| B01D 71/56 | (2006.01) |
| B01D 71/38 | (2006.01) |
| B01D 61/02 | (2006.01) |
| B01D 69/12 | (2006.01) |
| B01D 65/08 | (2006.01) |

(52) U.S. Cl.
CPC .......... *B01D 71/68* (2013.01); *B01D 69/02* (2013.01); *B01D 69/105* (2013.01); *B01D 71/08* (2013.01); *B01D 71/28* (2013.01); *B01D 71/76* (2013.01); *C02F 1/441* (2013.01); *B01D 61/025* (2013.01); *B01D 65/08* (2013.01); *B01D 69/125* (2013.01); *B01D 71/38* (2013.01); *B01D 71/56* (2013.01); *B01D 71/70* (2013.01); *B01D 2321/16* (2013.01); *B01D 2323/02* (2013.01); *B01D 2323/28* (2013.01); *B01D 2323/30* (2013.01); *B01D 2323/39* (2013.01); *B01D 2325/02* (2013.01)

(58) Field of Classification Search
None
See application file for complete search history.

(56) References Cited

U.S. PATENT DOCUMENTS

| | | | | |
|---|---|---|---|---|
| 10,507,435 B1 | * | 12/2019 | Frey | B01D 67/0079 |
| 2014/0326657 A1 | * | 11/2014 | Kang | B01D 69/148 |
| | | | | 210/490 |
| 2016/0107127 A1 | * | 4/2016 | Lee | B01D 69/125 |
| | | | | 96/4 |

* cited by examiner

*Primary Examiner* — Krishnan S Menon

(57) ABSTRACT

This invention provides a new high flux reverse osmosis (RO) membrane comprising a nanoporous polyethersulfone (PES)/polyethylene oxide-polysilsesquioxane (PEO-Si) blend support membrane (PES/PEO-Si) comprising a polyethylene oxide-polysilsesquioxane (PEO-Si) polymer and a polyethersulfone (PES) polymer, a hydrophilic polymer inside the pores on the skin layer surface of the polyethersulfone/polyethylene oxide-polysilsesquioxane blend support membrane, and a thin, nanometer layer of cross-linked polyamide on the skin layer surface of said polyethersulfone/polyethylene oxide-polysilsesquioxane blend support membrane, and a method of making such a membrane. This invention also provides a method of using the new high flux reverse osmosis membrane comprising nanoporous PES/PEO-Si blend support membrane for water purification.

16 Claims, No Drawings

HIGH FLUX REVERSE OSMOSIS MEMBRANE COMPRISING POLYETHERSULFONE/POLYETHYLENE OXIDE-POLYSILSESQUIOXANE BLEND MEMBRANE FOR WATER PURIFICATION

CROSS-REFERENCE TO RELATED APPLICATION

This application claims priority from U.S. Provisional Application No. 62/552,000 filed Aug. 30, 2017, the contents of which cited application are hereby incorporated by reference in its entirety.

BACKGROUND OF THE INVENTION

Over 170 Separex™ membrane systems have been installed in the world for gas separation applications such as for the removal of acid gases from natural gas, in enhanced oil recovery, and hydrogen purification. Two new Separex™ membranes (Flux+ and Select) have been commercialized recently by Honeywell UOP, Des Plaines, Ill. for carbon dioxide removal from natural gas. These Separex™ spiral wound membrane systems currently hold the membrane market leadership for natural gas upgrading. These membranes, however, are not suitable for water purification applications. Development of new stable, high flux, and high rejection membranes is critical for the future success of membranes for liquid phase separations such as water purification.

Reverse osmosis (RO) and nanofiltration (NF) membranes are the current most important technologies for water desalination and purification and they are experiencing significant growth. High fouling resistant, high flux and high selectivity RO and NF membranes will offer more opportunities for using membrane technology for water treatment applications.

SUMMARY OF THE INVENTION

The invention provides a new high flux reverse osmosis (RO) membrane comprising a nanoporous polyethersulfone (PES)/polyethylene oxide-polysilsesquioxane (PEO-Si) blend support membrane (PES/PEO-Si) comprising a polyethylene oxide-polysilsesquioxane polymer and a polyethersulfone polymer, a hydrophilic polymer inside the pores on the skin layer surface of the polyethersulfone/polyethylene oxide-polysilsesquioxane blend support membrane, and a layer of cross-linked polyamide on the skin layer surface of said polyethersulfone/polyethylene oxide-polysilsesquioxane blend support membrane.

An embodiment of the invention provides a method of making a high flux reverse osmosis membrane comprising: (a) preparation of a PES/PEO-Si blend polymer casting or spinning solution by dissolving PES and N,N'-bis-[(3-triethoxysilylpropyl)aminocarbonyl]-polyethylene oxide monomer in a mixture of solvents such as a mixture of N-methyl-2-pyrrolidone (NMP) and 1,3-dioxolane, a non-solvent such as an alcohol or a hydrocarbon, and additives such as a mixture of glycerol, lactic acid and water to form a homogeneous solution. The N,N'-bis-[(3-triethoxysilylpropyl)aminocarbonyl]-polyethylene oxide monomer will hydrolyze and polymerize in the presence of lactic acid catalyst to form polyethylene oxide-polysilsesquioxane polymer (PEO-Si) during this process; (b) preparation of a nanoporous PES/PEO-Si blend support membrane comprising hydrophilic polymers inside the pores on the skin layer surface of said support membrane via a phase inversion membrane casting or spinning fabrication process, the incorporation of the hydrophilic polymers into the pores on the skin layer surface of said support membrane is accomplished by the nipping of an aqueous solution of a hydrophilic polymer with a concentration in a range of 0.05 wt % to 5 wt % at the end of the membrane casting or spinning fabrication process or via the addition of the hydrophilic polymer to the gelation water tank during the membrane casting or spinning fabrication process; (c) coating a thin, nanometer layer of cross-linked polyamide on the skin layer surface of the PES/PEO-Si blend support membrane comprising hydrophilic polymers inside the pores on the skin layer surface of said support membrane via any coating method such as dip-coating, meniscus coating, or interfacial polymerization method; and (d) removal of the excess coating solution and dry the membrane.

A further embodiment of the invention is a process to treat a water stream comprising metal salts and small organic molecules, said process comprising passing said water feed stream to a feed side of a high flux reverse osmosis membrane comprising a polyethylene oxide-polysilsesquioxane blend nanoporous support membrane, a hydrophilic polymer inside the pores on the skin layer surface of the polyethylene oxide-polysilsesquioxane blend nanoporous support membrane, a cross-linked polyamide nano layer coated on the skin layer surface of the polyethylene oxide-polysilsesquioxane blend support membrane, so that no more than 0.5 wt % of the metal salts and small organic molecules in said water feed stream will pass through said high flux reverse osmosis membrane and recovering a permeate pure water stream comprising not less than 99.5 wt % of water.

DETAILED DESCRIPTION OF THE INVENTION

This invention provides a new high flux reverse osmosis (RO) membrane comprising a nanoporous polyethersulfone (PES)/polyethylene oxide-polysilsesquioxane (PEO-Si) blend support membrane (PES/PEO-Si) comprising a polyethylene oxide-polysilsesquioxane (PEO-Si) polymer and a polyethersulfone (PES) polymer, a hydrophilic polymer inside the pores on the skin layer surface of the polyethersulfone/polyethylene oxide-polysilsesquioxane blend support membrane, and a thin, nanometer layer of cross-linked polyamide on the skin layer surface of said polyethersulfone/polyethylene oxide-polysilsesquioxane blend support membrane, and a method of making such a membrane. The cross-linked polyamide on the skin layer surface of said polyethersulfone/polyethylene oxide-polysilsesquioxane blend support membrane can be formed from an interfacial polymerization of polyamidoamine dendrimer (PAMAM) or m-phenylenediamine (mPDA) with trimesoyl chloride (TMC). This invention also provides a method of using the new high flux RO membrane comprising nanoporous PES/PEO-Si blend support membrane for water purification.

The nanoporous polyethersulfone (PES)/polyethylene oxide-polysilsesquioxane (PEO-Si) blend support membrane described in the present invention comprises polyethylene oxide-polysilsesquioxane (PEO-Si) polymer and the polyethylene oxide polymer chain segment is much more hydrophilic than PES polymer. Therefore, the PES/PEO-Si blend support membrane is more hydrophilic than the PES only membrane. The improved hydrophilicity of the PES/PEO-Si blend support membrane significantly improved the adhesion between the nanoporous PES/PEO-Si blend support membrane and the cross-linked polyamide coating layer. The improved hydrophilicity of the PES/PEO-Si blend support membrane also improved the flux of the RO membrane comprising the nanoporous PES/PEO-Si blend support membrane and the cross-linked polyamide described in the present invention. The hydrophilic PES/PEO-Si blend support membrane improved the adhesion between the support membrane and the cross-linked polyamide polymer coating layer on top of the surface of the hydrophilic PES/PEO-Si blend support membrane and the anti-fouling property of the RO membrane.

The polyethylene oxide-polysilsesquioxane (PEO-Si) polymer in the nanoporous polyethersulfone (PES)/polyethylene oxide-polysilsesquioxane (PEO-Si) blend support membrane described in the present invention was insoluble in water and was prepared from N,N'-bis-[(3-triethoxysilylpropyl)aminocarbonyl]-polyethylene oxide monomer. The N,N'-bis-[(3-triethoxysilylpropyl)aminocarbonyl]-polyethylene oxide monomer was hydrolyzed and polymerized during the membrane casting dope preparation and membrane fabrication process.

The nanoporous polyethersulfone (PES)/polyethylene oxide-polysilsesquioxane (PEO-Si) blend support membrane has an average pore diameter of less than 10 nm on the membrane skin layer surface. The PES/PEO-Si blend support membrane is an asymmetric integrally skinned membrane with either flat sheet (spiral wound) or hollow fiber geometry.

The hydrophilic polymer inside the pores on the skin layer surface of the nanoporous polyethersulfone/polyethylene oxide-polysilsesquioxane blend support membrane in the present invention is used to reduce the pore size of the pores on the skin layer surface of the polyethersulfone/polyethylene oxide-polysilsesquioxane blend support membrane and prevent the deep penetration of the aqueous coating solution into the support membrane via the pores on the skin layer surface of the support membrane. Therefore, a thin, nanometer layer of cross-linked polyamide can be formed on the skin layer surface of the PES/PEO-Si blend support membrane.

The hydrophilic polymer inside the pores on the skin layer surface of the nanoporous PES/PEO-Si blend support membrane can be selected from, but is not limited to, a group of hydrophilic polymers containing chitosan, sodium carboxylmethyl-chitosan, carboxylmethyl-chitosan, hyaluronic acid, sodium hyaluronate, carbopol, polycarbophil calcium, poly(acrylic acid) (PAA), poly(methacrylic acid) (PMA), sodium alginate, alginic acid, poly(vinyl alcohol) (PVA), poly(ethylene oxide) (PEO), poly(ethylene glycol) (PEG), poly(vinylpyrrolidone) (PVP), gelatin, carrageenan, sodium lignosulfonate, and mixtures thereof.

The present invention discloses a method of making the new high flux reverse osmosis (RO) membrane comprising a PES/PEO-Si blend nanoporous support membrane, a hydrophilic polymer inside the pores on the skin layer surface of the PES/PEO-Si blend nanoporous support membrane, a thin, nanometer layer of cross-linked polyamide coated on the skin layer surface of the PES/PEO-Si blend support membrane. The cross-linked polyamide on the skin layer surface of said PES/PEO-Si blend support membrane can be formed from an interfacial polymerization of polyamidoamine dendrimer (PAMAM) or m-phenylenediamine (mPDA) with trimesoyl chloride (TMC). The method comprises: a) preparation of a PES/PEO-Si blend polymer casting or spinning solution by dissolving PES and a polyethylene oxide-based organosilane such as N,N'-bis-[(3-triethoxysilylpropyl)aminocarbonyl]-polyethylene oxide monomer in a mixture of solvents such as a mixture selected from N-methyl-2-pyrrolidone (NMP), 1,3-dioxolane, dimethylformamide (DMF), dimethyl sulfoxide (DMSO), a non-solvent such as an alcohol or a hydrocarbon, and additives such as a mixture of glycerol, lactic acid and water to form a homogeneous solution. The polyethylene oxide-based organosilane such as N,N'-bis-[(3-triethoxysilylpropyl)aminocarbonyl]-polyethylene oxide monomer hydrolyzes and polymerizes in the presence of lactic acid catalyst to form polyethylene oxide-polysilsesquioxane polymer (PEO-Si) during this process; b) preparation of a nanoporous PES/PEO-Si blend support membrane comprising hydrophilic polymers inside the pores on the skin layer surface of said support membrane via a phase inversion membrane casting or spinning fabrication process. The incorporation of the hydrophilic polymers into the pores on the skin layer surface of said support membrane is accomplished by the nipping of an aqueous solution of a hydrophilic polymer with a concentration in a range of 0.05 wt % to 5 wt % at the end of the membrane casting or spinning fabrication process or via the addition of the hydrophilic polymer to the gelation water tank during the membrane casting or spinning fabrication process; c) coating a thin, nanometer layer of cross-linked polyamide on the skin layer surface of the nanoporous PES/PEO-Si blend support membrane comprising hydrophilic polymers inside the pores on the skin layer surface of said support membrane via any coating method such as dip-coating, meniscus coating, or interfacial polymerization method. The thin, nanometer layer of cross-linked polyamide on the skin layer surface of the nanoporous PES/PEO-Si blend support membrane comprising hydrophilic polymers inside the pores on the skin layer surface of said support membrane can be formed via an interfacial polymerization of polyamidoamine dendrimer (PAMAM) or m-phenylenediamine (mPDA) with trimesoyl chloride (TMC) monomers via any coating method such as dip-coating or meniscus coating method by first coating an aqueous solution of PAMAM or mPDA with a concentration in a range of 0.2 wt % to 5 wt % and then coating an organic solution of TMC with a concentration in a range of 0.02 wt % to 2 wt %. The interfacial reaction between PAMAM or mPDA and TMC occurs within 1 minute to form the cross-linked polyamide on the surface of the support membrane; d) removal of the excess coating solution and dry the membrane.

The present invention provides a process to treat a water stream comprising metal salts and small organic molecules, said process comprising passing said water feed stream to a feed side of a high flux reverse osmosis (RO) membrane comprising a PES/PEO-Si blend nanoporous support membrane, a hydrophilic polymer inside the pores on the skin layer surface of the PES/PEO-Si blend nanoporous support membrane, a thin, nanometer layer of cross-linked polyamide coated on the skin layer surface of the PES/PEO-Si blend support membrane, so that no more than 0.5 wt % of the metal salts and small organic molecules in said water feed stream will pass through said high flux RO membrane and recovering a permeate pure water stream comprising not less than 99.5 wt % of water.

EXAMPLES

The following examples are provided to illustrate one or more preferred embodiments of the invention, but are not limited embodiments thereof. Numerous variations can be made to the following examples that lie within the scope of the invention.

Example 1

PES/PEG-Si Blend Porous Support Membrane

A hydrophilic PES/PEG-Si blend porous asymmetric integrally-skinned support membrane was prepared via a phase-inversion process. A membrane casting dope comprising, by approximate weight percentages, polyethersulfone 18-25%, N,N'-bis-[(3-triethoxysilylpropyl)aminocarbonyl]-polyethylene oxide 3-10%, N-methyl pyrrolidone 60-65%, 1,3-dioxolane 10-15%, glycerol 1-10%, lactic acid 0.5-4%, water 0-4%, n-decane 0.5-2% was cast on a nylon or polyester fabric then gelled by immersion in a 1° C. water bath for about 10 minutes, and then annealed in a hot water bath at 85° C. for about 5 minutes. A dilute aqueous solution of sodium alginate or chitosan was applied via a nipping method onto the surface of the wet, hydrophilic, porous, asymmetric PES/PEG-Si blend support membrane. The wet membrane comprising sodium alginate or chitosan within the pores on the membrane skin layer surface was used directly for the preparation of new high flux nanofiltration.

Example 2 mPDA-TMC-Polyamide/PES/PEG-Si Thin Film Composite (TFC) Reverse Osmosis (RO) Membrane The freshly prepared wet hydrophilic PES/PEG-Si blend porous asymmetric integrally-skinned support membrane comprising sodium alginate or chitosan within the pores on the membrane skin layer surface was immersed in a solution of 2 wt % m-phenylenediamine (mPDA) in water. After removal of excess m-phenylenediamine solution from the surface of the support membrane, the surface of the wet membrane was then immersed in a solution of 0.1 wt % trimesoyl chloride (TMC) in hexane. The contact time for the interfacial polymerization was about 10 seconds. The resulting cross-linked mPDA-TMC polyamide/PES/PEG-Si TFC RO membrane was air dried.

Example 3

PAMAM-TMC-Polyamide/PES/PEG-Si TFC RO Membrane

The freshly prepared wet hydrophilic PES/PEG-Si blend porous asymmetric integrally-skinned support membrane comprising sodium alginate or chitosan within the pores on the membrane skin layer surface was immersed in a solution of 1 wt % polyamidoamine dendrimer (PAMAM G2.0) in water. After removal of excess PAMAM solution from the surface of the support membrane, the surface of the wet membrane was then immersed in a solution of 0.1 wt % trimesoyl chloride (TMC) in hexane. The contact time for the interfacial polymerization was about 10 seconds. The resulting cross-linked PAMAM-TMC polyamide/PES/PEG-Si TFC RO membrane was air dried.

Example 4

Water Permeation Study on mPDA-TMC-Polyamide/PES/PEG-Si and PAMAM-TMC-Polyamide/PES/PEG-Si TFC RO Membranes The mPDA-TMC-Polyamide/PES/PEG-Si and PAMAM-TMC-Polyamide/PES/PEG-Si TFC RO membranes were tested under 5617-6996 kPa (800-1000 psig) pressure at 23° C. using an aqueous evioglaucine disodium salt dye (Fw=792.9 Dalton) solution (300 ppm) and under 4928 kPa (700 psig) pressure at 23° C. using an aqueous 500 ppm $MgCl_2$ solution, respectively. The mPDA-TMC-Polyamide/PES/PEG-Si TFC RO membrane showed 13.7 $L/m^2 \cdot h$ water flux under 1000 psig pressure and the PAMAM-TMC-Polyamide/PES/PEG-Si TFC RO membrane showed 50.4 $L/m^2 \cdot h$ high water flux under 800 psig pressure with >99.5% evioglaucine disodium salt dye rejection for both membranes. The mPDA-TMC-Polyamide/PES/PEG-Si TFC RO membrane showed 21.3 $L/m^2 \cdot h$ water flux under 4928 kPa (700 psig) pressure and the PAMAM-TMC-Polyamide/PES/PEG-Si TFC RO membrane showed 65.2 $L/m^2 \cdot h$ high water flux under 4928 kPa (700 psig) pressure with >99.5% $MgCl_2$ rejection for both membranes.

SPECIFIC EMBODIMENTS

While the following is described in conjunction with specific embodiments, it will be understood that this description is intended to illustrate and not limit the scope of the preceding description and the appended claims.

A first embodiment of the invention is a membrane comprising a nanoporous polyethersulfone/polyethylene oxide-olysilsesquioxane blend support membrane comprising a polyethylene oxide-polysilsesquioxane polymer and a polyethersulfone polymer, a hydrophilic polymer inside the pores on the skin layer surface of the nanoporous polyethersulfone/polyethylene oxide-polysilsesquioxane blend support membrane; and a layer of cross-linked polyamide on the skin layer surface of the nanoporous polyethersulfone/polyethylene oxide-polysilsesquioxane blend support membrane. An embodiment of the invention is one, any or all of prior embodiments in this paragraph up through the first embodiment in this paragraph wherein the hydrophilic polymer is selected from the group consisting of polymers containing chitosan, sodium carboxylmethyl-chitosan, carboxylmethyl-chitosan, hyaluronic acid, sodium hyaluronate, carbopol, polycarbophil calcium, poly(acrylic acid) (PAA), poly(methacrylic acid) (PMA), sodium alginate, alginic acid, poly(vinyl alcohol) (PVA), poly(ethylene oxide) (PEO), poly(ethylene glycol) (PEG), poly(vinylpyrrolidone) (PVP), gelatin, carrageenan, sodium lignosulfonate, and mixtures thereof. An embodiment of the invention is one, any or all of prior embodiments in this paragraph up through the first embodiment in this paragraph wherein the cross-linked polyamide is formed from an interfacial polymerization of polyamidoamine dendrimer or m-phenylenediamine with trimesoyl chloride. An embodiment of the invention is one, any or all of prior embodiments in this paragraph up through the first embodiment in this paragraph wherein the hydrophilic polymer inside the pores on the skin layer surface of the nanoporous polyethersulfone/polyethylene oxide-polysilsesquioxane blend support membrane is sodium alginate, sodium hyaluronate, or chitosan.

A second embodiment of the invention is a method of making a high flux reverse osmosis membrane comprising preparation of a polyethersulfone/polyethylene oxide-polysilsesquioxane blend polymer casting or spinning solution by dissolving polyethersulfone and a polyethylene oxide-based organosilane in a mixture of a solvent, a non-solvent, and an additive; preparation of a nanoporous polyethersulfone blend support membrane comprising hydrophilic polymers inside the pores on the skin layer surface of the support membrane via a phase inversion membrane casting or spinning fabrication process; coating a thin, nanometer layer of cross-linked polyamide on the skin layer surface of the nanoporous polyethersulfone/polyethylene oxide-polysilsesquioxane blend support membrane comprising hydrophilic polymers inside the pores on the skin layer surface of the support membrane via any coating method such as dip-coating, meniscus coating, or interfacial polymerization method; and removal of the excess coating solution and dry the membrane. An embodiment of the invention is one, any or all of prior embodiments in this paragraph up through the first embodiment in this paragraph wherein the hydrophilic polymer is selected from the group consisting of polymers containing chitosan, sodium carboxylmethyl-chitosan, carboxylmethyl-chitosan, hyaluronic acid, sodium hyaluronate, carbopol, polycarbophil calcium, poly(acrylic acid) (PAA), poly(methacrylic acid) (PMA), sodium alginate, alginic acid, poly(vinyl alcohol) (PVA), poly(ethylene oxide) (PEO), poly(ethylene glycol) (PEG), poly(vinylpyrrolidone) (PVP), gelatin, carrageenan, sodium lignosulfonate, and mixtures thereof. An embodiment of the invention is one, any or all of prior embodiments in this paragraph up through the first embodiment in this paragraph wherein the cross-linked polyamide is formed from an interfacial polymerization of polyamidoamine dendrimer or m-phenylenediamine with trimesoyl chloride. An embodiment of the invention is one, any or all of prior embodiments in this paragraph up through the first embodiment in this paragraph wherein the hydrophilic polymer inside the pores on the skin layer surface of the nanoporous polyethylene oxide-polysilsesquioxane blend support membrane is sodium alginate, sodium hyaluronate, or chitosan. An embodiment of the invention is one, any or all of prior embodiments in this paragraph up through the first embodiment in this paragraph wherein the polyethylene oxide-based organosilane is N,N'-bis-[(3-triethoxysilylpropyl)aminocarbonyl]-polyethylene oxide. An embodiment of the invention is one, any or all of prior embodiments in this paragraph up through the first embodiment in this paragraph wherein the solvent is selected from N-methyl-2-pyrrolidone, dimethylformamide, dimethyl sulfoxide, 1,3-dioxolane, 1,4-dioxane, or a mixture thereof. An embodiment of the invention is one, any or all of prior embodiments in this paragraph up through the first embodiment in this paragraph wherein the non-solvent is selected from an alcohol, a hydrocarbon, or a mixture thereof, An embodiment of the invention is one, any or all of prior embodiments in this paragraph up through the first embodiment in this paragraph wherein the additive is selected from glycerol, lactic acid, water, or a mixture thereof.

A third embodiment of the invention is a process to treat a water stream comprising metal salts and small organic molecules, the process comprising passing the water feed stream to a feed side of a high flux reverse osmosis membrane comprising a nanoporous polyethersulfone/polyethylene oxide-polysilsesquioxane blend support membrane, a hydrophilic polymer inside the pores on the skin layer surface of the nanoporous polyethersulfone/polyethylene oxide-polysilsesquioxane blend support membrane, a thin, nanometer layer of cross-linked polyamide coated on the skin layer surface of the nanoporous polyethersulfone/polyethylene oxide-polysilsesquioxane blend support membrane, so that no more than 0.5 wt % of the metal salts and small organic molecules in the water feed stream will pass through the high flux reverse osmosis membrane and recovering a permeate pure water stream comprising not less than 99.5 wt % of water. An embodiment of the invention is one, any or all of prior embodiments in this paragraph up through the second embodiment in this paragraph wherein the hydrophilic polymer is selected from the group consisting of polymers containing chitosan, sodium carboxylmethyl-chitosan, carboxylmethyl-chitosan, hyaluronic acid, sodium hyaluronate, carbopol, polycarbophil calcium, poly(acrylic acid) (PAA), poly(methacrylic acid) (PMA), sodium alginate, alginic acid, poly(vinyl alcohol) (PVA), poly(ethylene oxide) (PEO), poly(ethylene glycol) (PEG), poly(vinylpyrrolidone) (PVP), gelatin, carrageenan, sodium lignosulfonate, and mixtures thereof. The process of claim 13 wherein the cross-linked polyamide is formed from an interfacial polymerization of polyamidoamine dendrimer or m-phenylenediamine with trimesoyl chloride. An embodiment of the invention is one, any or all of prior embodiments in this paragraph up through the second embodiment in this paragraph wherein the hydrophilic polymer inside the pores on the skin layer surface of the nanoporous polyethersulfone/polyethylene oxide-polysilsesquioxane blend support membrane is sodium alginate, sodium hyaluronate, or chitosan.

The invention claimed is:

1. A membrane comprising a nanoporous polyethersulfone/polyethylene oxide-polysilsesquioxane blend support membrane comprising a polyethylene oxide-polysilsesquioxane polymer and a polyethersulfone polymer, a hydrophilic polymer inside the pores on the skin layer surface of said nanoporous polyethersulfone/polyethylene oxide-polysilsesquioxane blend support membrane; and a layer of cross-linked polyamide on the skin layer surface of said nanoporous polyethersulfone/polyethylene oxide-polysilsesquioxane blend support membrane.

2. The membrane of claim 1 wherein said hydrophilic polymer is selected from the group consisting of polymers containing chitosan, sodium carboxylmethyl-chitosan, carboxylmethyl-chitosan, hyaluronic acid, sodium hyaluronate, carbopol, polycarbophil calcium, poly(acrylic acid), poly(methacrylic acid), sodium alginate, alginic acid, poly(vinyl alcohol), poly(ethylene oxide), poly(ethylene glycol), poly(vinylpyrrolidone), gelatin, carrageenan, sodium lignosulfonate, and mixtures thereof.

3. The membrane of claim 1 wherein said cross-linked polyamide is formed from an interfacial polymerization of polyamidoamine dendrimer or m-phenylenediamine with trimesoyl chloride.

4. The membrane of claim 1 wherein the hydrophilic polymer inside the pores on the skin layer surface of the nanoporous polyethersulfone/polyethylene oxide-polysilsesquioxane blend support membrane is sodium alginate, sodium hyaluronate, or chitosan.

5. A method of making a high flux reverse osmosis membrane comprising:
  (a) preparation of a polyethersulfone/polyethylene oxide-polysilsesquioxane blend polymer casting or spinning solution by dissolving polyethersulfone and a polyethylene oxide-based organosilane in a mixture of a solvent, a non-solvent, and an additive;
  (b) preparation of a nanoporous polyethersulfone blend support membrane comprising hydrophilic polymers inside the pores on the skin layer surface of said support membrane via a phase inversion membrane casting or spinning fabrication process;
  (c) coating a thin, nanometer layer of cross-linked polyamide on the skin layer surface of the nanoporous polyethersulfone/polyethylene oxide-polysilsesquioxane blend support membrane comprising hydrophilic polymers inside the pores on the skin layer surface of said support membrane via any coating method such as dip-coating, meniscus coating, or interfacial polymerization method; and (d) removal of the excess coating solution and drying the membrane.

6. The method of claim 5 wherein said hydrophilic polymer is selected from the group consisting of polymers containing chitosan, sodium carboxylmethyl-chitosan, carboxylmethyl-chitosan, hyaluronic acid, sodium hyaluronate, carbopol, polycarbophil calcium, poly(acrylic acid), poly(methacrylic acid), sodium alginate, alginic acid, poly(vinyl alcohol), poly(ethylene oxide), poly(ethylene glycol), poly(vinylpyrrolidone), gelatin, carrageenan, sodium lignosulfonate, and mixtures thereof.

7. The method of claim 5 wherein said cross-linked polyamide is formed from an interfacial polymerization of polyamidoamine dendrimer or m-phenylenediamine with trimesoyl chloride.

8. The method of claim 5 wherein the hydrophilic polymer inside the pores on the skin layer surface of the nanoporous polyethylene oxide-polysilsesquioxane blend support membrane is sodium alginate, sodium hyaluronate, or chitosan.

9. The method of claim 5 wherein said polyethylene oxide-based organosilane is N,N'-bis-[(3-triethoxysilylpropyl)aminocarbonyl]-polyethylene oxide.

10. The method of claim 5 wherein said solvent is selected from N-methyl-2-pyrrolidone, dimethylformamide, dimethyl sulfoxide, 1,3-dioxolane, 1,4-dioxane, or a mixture thereof.

11. The method of claim 5 wherein said non-solvent is selected from an alcohol, a hydrocarbon, or a mixture thereof.

12. The method of claim 5 wherein said additive is selected from glycerol, lactic acid, water, or a mixture thereof.

13. A process to treat a water stream comprising metal salts and small organic molecules, said process comprising passing said water feed stream to a feed side of a high flux reverse osmosis membrane comprising a nanoporous polyethersulfone/polyethylene oxide-polysilsesquioxane blend support membrane, a hydrophilic polymer inside the pores on the skin layer surface of said nanoporous polyethersulfone/polyethylene oxide-polysilsesquioxane blend support membrane, a thin, nanometer layer of cross-linked polyamide coated on the skin layer surface of the nanoporous polyethersulfone/polyethylene oxide-polysilsesquioxane blend support membrane, so that no more than 0.5 wt % of the metal salts and small organic molecules in said water feed stream will pass through said high flux reverse osmosis membrane and recovering a permeate pure water stream comprising not less than 99.5 wt % of water.

14. The process of claim 13 wherein said hydrophilic polymer is selected from the group consisting of polymers containing chitosan, sodium carboxylmethyl-chitosan, carboxylmethyl-chitosan, hyaluronic acid, sodium hyaluronate, carbopol, polycarbophil calcium, poly(acrylic acid), poly(methacrylic acid), sodium alginate, alginic acid, poly(vinyl alcohol), poly(ethylene oxide), poly(ethylene glycol), poly(vinylpyrrolidone), gelatin, carrageenan, sodium lignosulfonate, and mixtures thereof.

15. The process of claim 13 wherein said cross-linked polyamide is formed from an interfacial polymerization of polyamidoamine dendrimer or m-phenylenediamine with trimesoyl chloride.

16. The process of claim 13 wherein the hydrophilic polymer inside the pores on the skin layer surface of the nanoporous polyethersulfone/polyethylene oxide-polysilsesquioxane blend support membrane is sodium alginate, sodium hyaluronate, or chitosan.

\* \* \* \* \*